United States Patent [19]

Wachter

[11] Patent Number: 5,549,815
[45] Date of Patent: Aug. 27, 1996

[54] METHOD FOR FLUIDIZING A DENSE PHASE BED OF SOLIDS

[75] Inventor: William A. Wachter, Baton Rouge, La.

[73] Assignee: Exxon Research and Engineering Company, Florham Park, N.J.

[21] Appl. No.: 246,543

[22] Filed: May 20, 1994

[51] Int. Cl.[6] .................................................. C10G 35/14
[52] U.S. Cl. ......................... 208/164; 208/163; 208/176; 208/113
[58] Field of Search ................................. 208/163, 164, 208/113, 127, 176; 134/6, 7, 27.8; 422/139, 145, 147

[56] References Cited

U.S. PATENT DOCUMENTS

| | | | |
|---|---|---|---|
| 4,601,814 | 7/1986 | Mauleon et al. | 208/113 |
| 4,606,135 | 8/1986 | Morin | 34/57 B |
| 4,978,441 | 12/1990 | Buchanan et al. | 208/113 |
| 5,105,559 | 4/1992 | Toth | 34/57 B |
| 5,195,845 | 3/1993 | Parks | 405/74 |
| 5,344,554 | 9/1994 | Pontier et al. | 208/164 |

OTHER PUBLICATIONS

J. S. Buchanan, H. J. Schoennagle. "Moving cup particulates feeder used in laboratory." Powder Technology, 78 (1994) 281–285.

A. M. Squires, M. Kwauk, A. A. Avidan. "Fluid Beds: At Last, Challenging Two Entrenched Practices." SCIENCE, Dec. 20, 1985, vol. 230, No. 4732.

D. Geldart. "Types of Gas Fluidizaion." Powder Technology, 7 (1973) 285–292.

Primary Examiner—Asok Pal
Assistant Examiner—Bekir L. Yildirim
Attorney, Agent, or Firm—Richard D. Jordan; James H. Takemoto

[57] ABSTRACT

Disclosed is a method for fluidizing a dense phase bed of solid particles, preferably a method for fluidizing a dense phase bed of solid catalyst particles. The method includes the steps of continuously supplying a flowing fluid stream in a downward direction within an enclosed volume; contacting an upper surface of a dense phase bed of solid particles resting within the enclosed volume with the downward flowing fluid stream; continuously directing the flowing fluid stream into the dense phase bed of particles to form a continuous fluidized bed of solid particles within the enclosed volume; directing the flowing fluid stream in an upward direction after contacting the upper surface of the dense phase bed; and collecting the flowing fluid stream.

4 Claims, 1 Drawing Sheet

METHOD FOR FLUIDIZING A DENSE PHASE BED OF SOLIDS

FIELD OF THE INVENTION

This invention is directed to a method for fluidizing a dense phase bed of solid particles. In particular, this invention is to a method for fluidizing a dense phase bed of solid catalyst particles.

BACKGROUND OF THE INVENTION

Fluidization is typically observed when a dense phase bed of solid particles comes in contact with a vertical upward fluid flow, in an intermediate range of flow rates. At low flow rates or velocities, the solid particles lie on one another in a dense phase state. At high flow rates or velocities, the solid particles are conveyed upward and out of a vertical column. This is known as hydraulic or pneumatic transport. At intermediate flow or velocity ranges, each particle becomes individually suspended in the fluid as it flows past the particles. On the whole, the bed of solid particles remains motionless relative to the walls of the vertical column. This bed is considered to be fluidized.

A typical system for fluidizing solid particles uses a cylindrical vertical column. Prior to fluidization, a surface of the dense phase bed of solid rests against a fluid permeable support which is affixed to the vertical column. Fluidization is initiated by flowing either a liquid or vapor fluid into the vertical column below the fluid permeable dense phase bed support. The permeable dense phase bed support acts as a distributor as the flowing fluid passes through the support, and the fluid is directed to evenly contact the supported surface of the dense phase bed. After contacting the supported dense phase bed surface, the fluid flows through the entire dense phase bed where the fluid comes into contact with the upper surface of the bed. As the fluid contacts the upper surface, fluidization of the dense phase bed begins. In essence, fluidization in such a column is the result of the flowing fluid pushing the solid particles away from the dense phase portion of the bed. Fluidization itself is actually initiated only after the flowing fluid has passed through the entire dense phase bed.

Various commercial fluidization systems are described by Squires et al., "Fluidized Beds: At Last, Challenging Two Entrenched Practices", *Science*, 1985, 230, 1329–1337. Squires demonstrates that the typical fluidization systems follow either the "German" practice for treating course solids or the "American" practice for dealing with fine powders.

A problem with the typical dense phase system is that the fluid which initially contacts the dense phase bed must flow completely through the dense phase bed before fluidization begins. This type of system requires a rather lengthy amount of time to reach steady state conditions in which an entire dense phase bed of solids becomes continuously fluidized. Such a system is not desirable, for example, when the solids are catalyst particles, and it is desirable to quickly reach fluidized steady state reaction conditions.

SUMMARY OF THE INVENTION

The present invention overcomes many of the problems inherent in the prior art by providing a method for fluidizing a dense phase bed of solids comprising continuously supplying a flowing fluid stream in a downward direction within an enclosed volume; contacting an upper surface of a dense phase bed of solid particles resting within the enclosed volume with the downward flowing fluid stream under conditions sufficient to expand the dense phase bed of solid particles at its upper surface into a fluidized bed of solid particles within the enclosed volume; continuously directing the flowing fluid stream into the dense phase bed of particles to form a continuous fluidized bed of solid particles within the enclosed volume; directing the flowing fluid stream in an upward direction after contacting the upper surface of the dense phase bed; and collecting the flowing fluid stream. Preferably, the dense phase bed of solid particles solid material has a density of less than 1.4 g/cm$^3$.

In a preferred embodiment, the dense phase solids bed is a catalyst. Preferably, the catalyst is a cracking catalyst.

In another preferred embodiment, the flowing fluid is a vapor. Preferably, the vapor is a hydrocarbon vapor.

BRIEF DESCRIPTION OF THE DRAWING

The present invention will be better understood by reference to the Detailed Description of the Invention when taken together with the drawing, wherein.

DETAILED DESCRIPTION OF THE INVENTION

Figure 1:
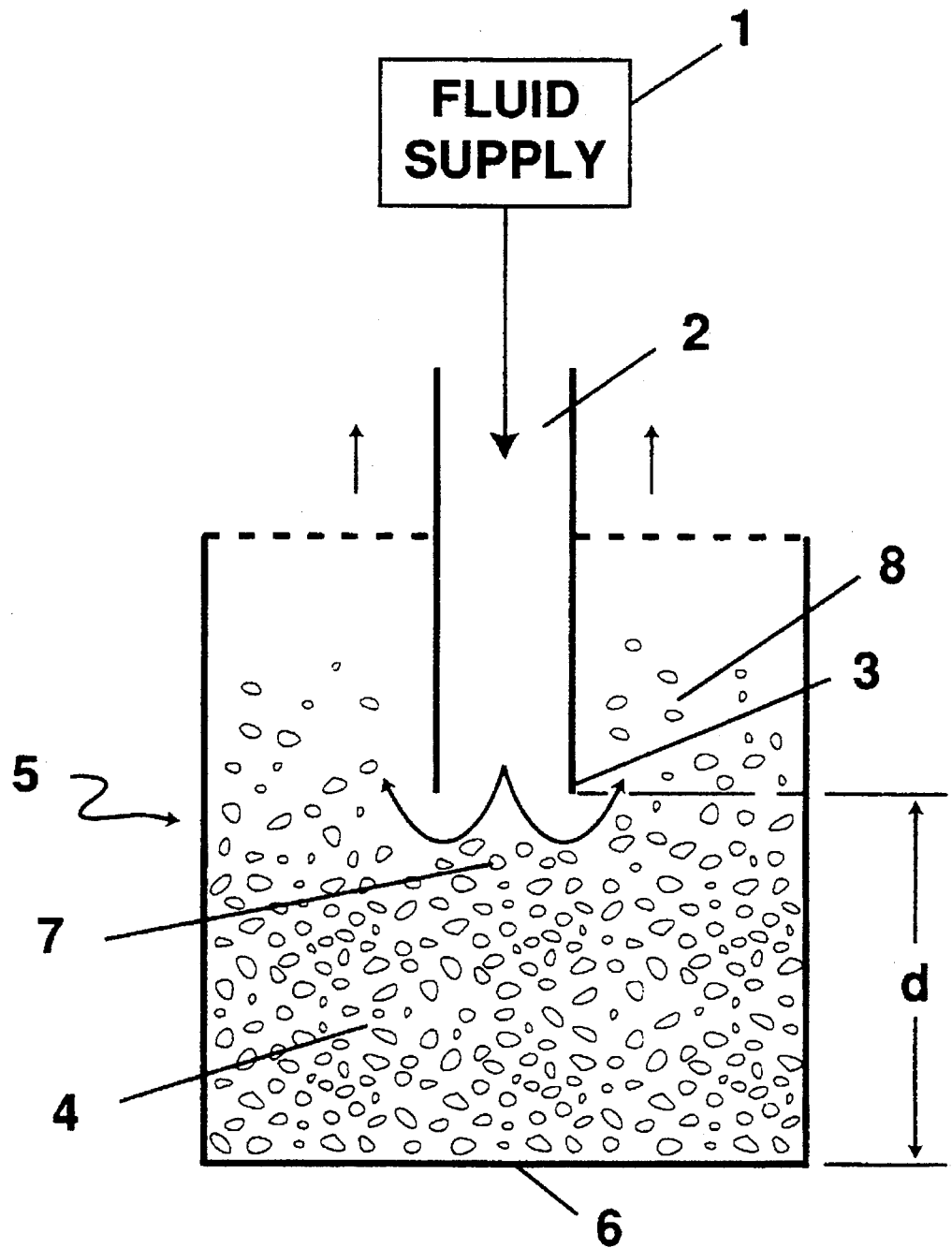
FIG. 1 shows a schematic representation of a preferred embodiment of the solids fluidization system.

It has been found that a dense phase bed of solid particles can be advantageously fluidized by continuously contacting a surface of the dense phase bed with a flowing fluid under conditions sufficient to expand the contacted surface of the dense phase bed of solid particles into a fluidized bed of solid particles. By expanding the dense phase bed of solid particles at the surface where it is initially contacted, fluidization begins almost immediately. An advantage in the almost immediate fluidization of solid particles is that steady state conditions are achieved in an extremely short period of time. This is particularly advantageous when the solid particles are catalyst particles and the fluid which contacts the surface of the dense phase bed is a reaction medium.

According to this invention, the dense phase bed of solid particles is a volume of solid particles being acted upon only by the forces of gravity and a means of support. In this state, the density of the entire volume of particles is the density of the solid material. Preferably, the dense phase bed of solid particles solid material has a density of less than 1.4 g/cm$^3$.

The particles can be any shape, but are preferably spherical and of sufficient diameter so that there is a relatively smooth transition to the fluidized state. Preferably the particles will have an average diameter of 200–500 microns, more preferably 30–150 microns.

A fluidized bed of solids is formed when a given volume of solids is acted upon by a fluid and the density of the given volume is decreased as a result of the fluid displacing a portion of the solids within the volume. In essence, the fluidized bed of solids is formed when a dense phase bed of solids is converted to a dilute phase region comprising solids and fluid. Preferably, the fluidized bed has a density that is between the density of the fluid component and the solids component. It is more preferred that the fluidized bed have a density of 200–3000 kg/m$^3$, most preferably 400–2000 kg/m$^3$.

The solid particles can be made of an inert material or the material can be catalytic in nature. The particles can also be used as a solid support for a catalyst material, and the catalyst material can be imbedded into or adsorbed on the solid support.

Examples of inert and catalytic materials which can be used as solid particles include aluminum oxides, oxyhydroxides, hydroxides, silicon oxides, aluminosilicates, clays, zeolites, tectosilicates, phyllosilicates, metals supported on any of the aforementioned particles, metal sulfides, ceramics including oxides, nitrides and carbides, organic and inorganic polymers, and ceramic/metal composites.

Examples of catalyst compounds which can be imbedded into or adsorbed on the solid support particles include colloidal particles of aluminum oxides, oxyhydroxides, hydroxides, silicon oxides, aluminosilicates, clays, zeolites, tectosilicates, phyllosilicates, dispersed metals, metal oxides or sulfides, ceramics including oxides, nitrides and carbides, organic and inorganic polymers, ceramic/metal composites, proteins and nucleic acids.

The fluid which is used to achieve fluidization according to this invention is any fluid that is capable of freely flowing in a continuous state, and which can flow under conditions which will suspend the solid particles in the fluid as the fluid flows past the suspended particles. The flowing fluid can be a liquid or a vapor. Preferably the flowing fluid is a vapor, more preferably a vapor which acts as a reaction medium.

Examples of liquid materials which are preferred to fluidize the dense phase solids bed in this invention include water, hydrocarbons of molecular weight ranges from methane to materials boiling in excess of 1200° F., emulsions of hydrocarbons and water, emulsions of immiscible hydrocarbons, foams in which the continuous phase is hydrocarbon and the discontinuous phase is air, carbon dioxide, nitrogen or gaseous hydrocarbon.

Examples of vapor materials which are preferred to fluidize the dense phase solids bed in this invention include the noble gases, diatomic gases including hydrogen, nitrogen and oxygen, water, hydrogen sulfide, ammonia, hydrocarbons including compounds with oxygen, nitrogen, sulfur and arsenic, and aerosols containing liquid or solid particles of the aforementioned hydrocarbons suspended in a gaseous phase.

It is preferable in this invention that the flowing fluid stream be supplied to an enclosed volume in a downward direction. In this manner, the dense phase bed can be supported within the closed volume using a minimal amount of support structure, and the flowing fluid can contact the upper surface of the dense phase bed.

The fluid stream should contact the surface of the dense phase bed under conditions which are sufficient to expand the solid particles into a fluidized state. The conditions include several variables acting at once, and fluidization can be achieved according to the parameters understood by those of ordinary skill in the art. See, e.g., *Fluidization*, Second Edition, Davidson et al., Eds., Academic Press, 1985, particularly pages 1–44, which are incorporated herein by reference, and which describe the relevant relationships between pressure, density, velocity and bed height which should be taken into consideration in order to obtain the desirable momentum balance. See also, Geldart, "Types of Gas Fluidization", *Powder Technology*, 1973, 7, pages 285–292 being incorporated herein by reference, who points out that under certain conditions a plug of moving catalyst can be formed prior to fluidization.

According to this invention, once fluidization of the dense phase bed surface begins, the fluid stream is fed continuously into the dense phase bed so that fluidization is continued until at least a desirable portion of the solid particles in the dense phase bed is expanded to a fluidized state within the enclosed volume. The extent to which a dense phase bed is fluidized is determined by the needs of the user. For example, if it is desirable to run a catalytic reaction, with the solid particles serving as the catalyst and the fluid stream serving as the reaction medium, the parameters contributing to fluidization are controlled by the quantity of product desired.

After the flowing fluid stream has contacted the dense phase bed surface, the flowing fluid is controlled to flow in a direction which is opposite to that of the flowing fluid stream prior to contacting the dense phase bed. From a practical standpoint, it is preferable that the flowing fluid contact the dense phase in a downward direction to affect fluidization, and that the fluid be directed upwardly after contact with the dense phase bed for collection. These steps of directing fluid flow ensure that the flowing fluid stream does not travel through the entire dense phase bed, thereby delaying initiation of the fluidization process.

It is to be understood that the terms "upward" and "downward" are used to describe a relative comparison of directional movement. The terms should not be considered to be exactly defining of movement of fluid flow at specific angular orientation or at any specific instant in time or to be precisely representative of any time derived fluid flow profile. Instead, these terms should be taken to provide an overall understanding of the entire mass flow of the fluid, as it will be appreciated that certain flow regimes, e.g., backflow and turbulent flow regimes, which do occur in the flow regimes of this invention, are not intended to be accounted for in the overall concept of the invention.

The overall concept of this invention can be better explained with reference to FIG. 1, which is a schematic representation of a preferred embodiment of the invention. As shown in FIG. 1, a flowing fluid stream is supplied from a fluid supply 1 to a fluid injection means 2. The fluid can be a liquid or vapor and is transported under pressure from the fluid supply 1, which includes a pump or compressor.

The flowing fluid stream passes through the fluid injection means 2, leaving the fluid injection means 2 by way of a fluid outlet 3. The fluid is sent from the fluid outlet 3 toward a dense bed of solid particles 4 which is maintained within a dense bed solids housing 5. The dense bed solids housing 5 includes a dense bed solids support 6.

As the fluid contacts the surface 7 of the dense bed of solid particles 4, fluidization begins. The subsurface portion of dense bed of solid particles 4 is fluidized by continuously directing the flowing fluid stream into the dense bed. By continuously directing the flowing fluid stream into the dense bed, it is meant that the distance, d, between the fluid outlet 3 and the dense bed solids support 6 is continuously decreased at a rate which promotes fluidization of the dense bed. Preferably, the distance d is continuously decreased by moving the dense bed solids support 6 toward the fluid outlet 3, which is held stationary. Alternatively, the dense bed solids support 6 is held stationary, and the fluid outlet means 3 is moved toward the dense bed solids support 6. In yet another alternative embodiment, both the dense bed solids support 6 and the fluid outlet 3 are moved toward another at the same time.

In order to quickly and efficiently achieve the fluidized state, the flowing fluid is directed to flow away from the dense phase bed after contact with the surface 7. As shown in FIG. 1, the flowing fluid is preferably directed to flow in an upward direction so that fluidization begins upon contact. As the flowing fluid moves in its upward direction, it passes through a fluidized solids region 8 and is later collected.

The invention will be further understood by reference to the following Example, which includes a preferred embodiment of the invention.

EXAMPLE

A solids fluidizing system was manufactured using a stainless steel tube as the dense bed solids housing. The bottom end of the tube contained a bed of cracking catalyst, and the bottom end of the tube was attached to a rotating driver mechanism. The tube was rotated toward a steel rod which contained two spiral grooves which began at one end of the rod and wound around the rod for at least about ¾ of the entire length of the rod. Within one groove of the rod were laid thermocouples and lines for injecting feed and quench gas. As the tube was rotated toward the rod, hydrocarbon feed was fed to the tip of the rod, with the tip acting as a velocity increasing means. The feed continuously contacted the surface of the catalyst bed as the tube was rotated toward the rod, thereby forcing the surface catalyst up the open groove of the rod. Further up the rod, a quench gas was introduced which blew the catalyst and cracked hydrocarbon product up and out of the remainder of the catalyst bed. The catalyst occupied the annular space between the tube wall and the rod, and a second gas stream was used to strip additional cracked product. The cracked product was collected using a frit mounted about the rod, the frit serving as a barrier between the feed line and the product outlet. The catalyst within the tube was maintained at 500° C., and run times were less than one minute at 45 psia oil partial pressure.

Having now fully described this invention, it will be appreciated by those skilled in the art that the invention can be performed within a wide range of parameters within what is claimed.

What is claimed is:

1. A method for fluidizing a dense phase bed of cracking catalyst particles comprising:

providing a dense bed of cracking catalyst particles within an enclosed volume, said enclosed volume comprising a housing containing a dense bed of cracking catalyst particles;

providing a means for injecting fluids into the housing, wherein said injection means contains an inlet and outlet, and the outlet of said injection means is above and downwardly directed towards the upper surface of the dense bed of cracking catalyst particles;

continuously supplying a flowing fluid stream through said injection means under conditions sufficient to expand the dense bed of cracking catalyst particles at its upper surface into a fluidized bed of cracking catalyst particles without fluidizing the underlying dense bed of cracking catalyst particles whereby the flowing fluid stream is caused to flow in an opposite direction upon contacting the upper surface of the bed of cracking catalyst particles by the solids housing enclosing said particles;

continually maintaining the distance between the outlet of the injection means and the upper surface of the bed of cracking catalyst particles such that said upper surface is continually in a fluidized state;

directing the oppositely flowing stream containing fluidized cracking catalyst particles and fluid medium in said opposite direction until it exits the solids housing; and collecting the fluidized cracking catalyst particles in the flowing fluid stream.

2. The method of claim 1, wherein the dense phase bed has a density of less than 1.4 g/cm$^3$.

3. The method of claim 1, wherein the flowing fluid is a vapor.

4. The method of claim 3, wherein the vapor is a hydrocarbon vapor.

* * * * *